(12) United States Patent
Forlong

(10) Patent No.: US 9,981,355 B2
(45) Date of Patent: May 29, 2018

(54) ABOVE PLATE COOLANT CONTAINMENT AND RECOVERY SYSTEM

(75) Inventor: Murray Houlton Forlong, Auckland (NZ)

(73) Assignee: EIGEN SYSTEMS LIMITED, Auckland (NZ)

( * ) Notice: Subject to any disclaimer, the term of this patent is extended or adjusted under 35 U.S.C. 154(b) by 1137 days.

(21) Appl. No.: 14/238,995

(22) PCT Filed: Aug. 17, 2012

(86) PCT No.: PCT/NZ2012/000147
§ 371 (c)(1),
(2), (4) Date: Feb. 14, 2014

(87) PCT Pub. No.: WO2013/073958
PCT Pub. Date: May 23, 2013

(65) Prior Publication Data
US 2014/0202996 A1 Jul. 24, 2014

(30) Foreign Application Priority Data

Aug. 19, 2011 (NZ) ........................................ 594685

(51) Int. Cl.
*B23K 9/00* (2006.01)
*B23K 15/00* (2006.01)
(Continued)

(52) U.S. Cl.
CPC ........ *B23Q 11/0075* (2013.01); *B22D 11/126* (2013.01); *B23K 10/00* (2013.01);
(Continued)

(58) Field of Classification Search
CPC ... B08B 15/005; B08B 2270/62; B23C 1/002; B23C 1/06; B23C 2230/08;
(Continued)

(56) References Cited

U.S. PATENT DOCUMENTS 3,750,507 A * 8/1973 Gerber ............... A41H 43/0292
83/169
4,388,028 A 6/1983 Bodin
(Continued)

FOREIGN PATENT DOCUMENTS

DE 20219189 U1 2/2003
DE 102005050829 A1 4/2007
(Continued)

*Primary Examiner* — Sang Y Paik
(74) *Attorney, Agent, or Firm* — Greer, Burns & Crain, Ltd.

(57) ABSTRACT

A machine is provided, including at least one cutting tool in the form of cutting head with coolant supplied for machining parts from flat material, wherein the machine also includes a coolant containment and recovery system which includes: a waste removal apparatus, a coolant guard having at least one wall bounding a containment forming area, wherein the coolant guard is fluidly connected to the waste removal apparatus, wherein in use: the coolant guard is located upon a plate to be machined; and the containment forming area becomes a containment area, within which the cutting tool and coolant are both located during the machining process, so that used coolant can be removed.

14 Claims, 2 Drawing Sheets

(51) Int. Cl.
*B23Q 11/00* (2006.01)
*B22D 11/126* (2006.01)
*B23K 10/00* (2006.01)
*B23Q 11/10* (2006.01)
*B23Q 39/02* (2006.01)

(52) U.S. Cl.
CPC ...... *B23Q 11/0046* (2013.01); *B23Q 11/1015* (2013.01); *B23Q 11/1069* (2013.01); *B23Q 39/021* (2013.01); *Y02P 70/171* (2015.11); *Y10T 409/304032* (2015.01)

(58) Field of Classification Search
CPC ..... B23K 26/0093; B23K 10/00; B23P 23/04; B23Q 11/0046; B23Q 11/0075; B23Q 1/0027; B23Q 1/012; B23Q 2240/002; B23Q 39/021; B23Q 39/022; B23Q 11/1015; B23Q 11/1069; F16L 41/18; H01H 1/26; Y02P 70/171; Y10T 29/5107; Y10T 408/50; Y10T 409/304088; Y10T 409/308288; Y10T 83/207; Y10T 83/2092; C07D 311/94; C07D 405/12; C07D 413/12; C07D 417/14; B22D 11/126
USPC .......................................... 219/121.6–121.86
See application file for complete search history.

(56) References Cited

U.S. PATENT DOCUMENTS

| | | | |
|---|---|---|---|
| 5,356,245 A | 10/1994 | Hosoi et al. | |
| 5,902,497 A * | 5/1999 | Alber | B23K 26/146 219/121.63 |
| 5,980,379 A | 11/1999 | Shibata et al. | |
| 6,908,372 B2 * | 6/2005 | Larsson | B24C 1/045 451/38 |
| 7,464,630 B2 * | 12/2008 | Knaupp | B24C 1/045 451/91 |
| 8,763,617 B2 * | 7/2014 | Lenkeit | B08B 15/04 134/104.2 |
| 2003/0116354 A1 | 6/2003 | Yamashita | |
| 2005/0105975 A1 | 5/2005 | Wood et al. | |
| 2008/0075545 A1 | 3/2008 | Forlong | |
| 2009/0136309 A1 | 5/2009 | Coulston et al. | |

FOREIGN PATENT DOCUMENTS

| | | |
|---|---|---|
| EP | 0555575 A1 | 8/1993 |
| GB | 2269551 A | 2/1994 |
| WO | 03/072299 A1 | 9/2003 |

* cited by examiner

ABOVE PLATE COOLANT CONTAINMENT AND RECOVERY SYSTEM

The invention relates to an above plate coolant containment and extraction or recovery system. The invention is directed particularly but not solely towards enabling thermal cutting machines to be able to cut part profiles from flat material in on a dry cutting table environment and to enable the use of machining coolant during wet cutting machining operations by using a coolant containment and extraction system.

BACKGROUND

Large machines that use coolant during machining operations are not able to easily contain the coolant on the surface of the item (e.g. plate) being machined and require substantial guards and guttering around the cutting table to contain and collect the coolant used.

Additionally machines that cut profiles from large plates require various types of processes to be performed on each part. Typically the part will require a process to sever the part profile from the parent plate but will also require machining operations such as drilling, tapping or milling which can use coolant during the machining operation. Typically the machining operations are performed prior to the profile being cut out to ensure the part is supported during the machining operations.

Typically on a cutting machine for dry cutting, such as a profile cutting machine, the bridge of the profile cutting machine is often fitted with laser, oxy fuel and plasma cutting torches and can also be fitted with high speed spindles for machining operations.

Currently when a combination machine fitted with both a thermal cutting (which is essentially dry cutting) and a machining head (which ideally uses coolant during cutting) and operates over a dry table system then the cutting table is fitted with a fume extraction system to remove the fumes and smoke caused during cutting processes such as may occur with laser, plasma or oxy fuel processes. The fume extraction is located under the plate being processed such that the air below the plate is extracted complete with the fumes. These fumes are ducted to a filter system where the dust particles in the fumes are extracted from the air such that the air vacating the filters is clean. The filter membranes in these systems must remain dry to prevent blocking.

When machining operations are incorporated on this style of machine, oil mist or very small amounts of coolant are applied to the machining operations whereby any coolant applied can fall through holes, cuts or off the edge of the plate being cut and can be sucked up with the fume extraction system when it is turned on and cause problems with the filters on the extraction system. There is no way to recycle the coolant from machining operations or any method to contain the coolant.

The disadvantage of this existing style of machine is that there is no method to keep separate the coolant from the fume extraction system so because of this the amount of the actual coolant that is used is minimized. Additionally the machining tools do not receive the ideal level of cooling and lubrication thereby reducing the machining speed and tool life. Additionally there is no coolant available to assist in the removal of chips generated during the machining processes as occurs during deep hole drilling where coolant is used to push the chips up out of the hole.

Additionally there is no method to recover or recycle the coolant. Therefore current methods use more tools, coolant and filters than is strictly necessary which adds to the cost of cutting profiles in plate.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Object

It is an object of the invention to an above plate coolant containment and recovery system for a cutting machine having a machining head having a machining spindle incorporating coolant for use with the machining spindle tools that ameliorates some of the disadvantages and limitations of the known art.

Alternatively, it is at least an object of the invention to provide the public with a useful choice.

SUMMARY OF INVENTION

In a first embodiment the invention comprises a coolant containment and recovery system for a cutting or milling machine having at least one machining head having at least one cutting tool using coolant during the machining of parts from flat material and to enable the use of machining coolant during machining operations by using the coolant containment and extraction system, the above plate coolant containment and recovery system including a coolant guard apparatus and waste removal means, wherein the coolant guard apparatus is shaped and positioned to contain and separate coolant fluid as used during wet cutting machining to provide a dry cutting environment beyond the coolant guard apparatus, the coolant guard apparatus includes at least one shaped containment area formed with a substantially upright perimeter wall which in use is located on top of the plate to be cut to form the contained area whereby the waste removal means which is fluidly connected to the coolant guard apparatus, causes the removal of the used coolant and machining solid waste without leaking beyond the containment area.

Preferably the cutting machine is also provided with a dry cutting system including at least one thermal cutting head for dry cutting to enable thermal cutting heads to be able to cut profiles from the plate wherein the thermal cutting head includes at least one cutting tool.

Preferably the coolant guard apparatus incorporates clamping means which is shaped and configured to enable the perimeter wall to better contact the plate to form the containment area whereby in combination the waste removal means is able to remove the waste from the containment area.

Preferably the clamping means includes a plate clamp member located on or as part of a lower portion of the perimeter wall.

Preferably the coolant guard apparatus is substantially ring shaped thereby having at least one exit aperture located in the containment area bordered by the perimeter walls.

Preferably the upright perimeter walls are planar in shape extending upwardly from the containment area to a height to be able when in use contain the coolant being used and allow coolant recovery and waste removal by the waste removal means.

Preferably the coolant guard apparatus is movably supported to the machine by at least one substantially vertical support member.

Preferably the waste removal means includes ducting fluidly connected to the at least one aperture formed in the perimeter wall to take away all waste including fluid waste such as used coolant and solid waste such as chips wherein the ducting provides suction as a vacuum to cause the removal of the waste.

Preferably the ducting extends away from the cutting face to a storage means whereby any solid waste is separated out while the coolant is recycled back to the machining spindle to be reused for cutting at the lower end or cutting face wherein the exit aperture is connected to the ducting.

Preferably the coolant is filtered prior to being recycled back to the machining spindle.

Preferably the machining spindle includes a spindle coolant means fluidly connected to recycled coolant tank which is adapted to allow coolant through the spindle and tool for cutting at the cutting face or alternatively the coolant is supplied externally from the machining spindle directly onto the cutting tool.

Preferably the cutting table consists of the dry table with fume extraction means for use during thermal cutting operations.

Preferably, a fume extraction apparatus is located under the plate or table and is shaped as ducting with suction means being attached to an under side of the table wherein the fume extraction means is located under a dry table.

Preferably the coolant guard are operatively adapted to move vertically independently of any other operation of the machine cutting head and/or thermal cutting head.

Preferably the machining head and thermal cutting head are operatively and slidably mounted to a carriage on a gantry in the Y axis whereby the gantry is guided to travel horizontally in the X axis.

Preferably the machining head and thermal cutting head are mounted to the carriage wherein the carriage is movably guided to travel in a horizontal Y axis which is at right angles to the X axis and each of these cutting tools has its own vertical or Z axis drive and guide system.

Preferably the above plate coolant containment and recovery system can be used on a cutting machine with no thermal cutting heads.

Preferably the above plate coolant containment and recovery system can be used on a cutting machine with a water table.

In a second embodiment the invention comprises a cutting or milling machine having a coolant containment and recovery system and at least one machining head having at least one cutting tool using coolant during the machining of parts from flat material and to enable the use of machining coolant during machining operations by using the coolant containment and extraction system, the above plate coolant containment and recovery system including a coolant guard apparatus and waste removal means, wherein the coolant guard apparatus is shaped and positioned to contain and separate coolant fluid as used during wet cutting machining to provide a dry cutting environment beyond the coolant guard apparatus, the coolant guard apparatus includes at least one shaped containment area formed with a substantially upright perimeter wall which in use is located on top of the plate to be cut to form the contained area whereby the waste removal means which is fluidly connected to the coolant guard apparatus, causes the removal of the used coolant and machining solid waste without leaking beyond the containment area.

BRIEF DESCRIPTION OF THE DRAWINGS

The invention will now be described, by way of example only, by reference to the accompanying drawings.

DETAILED DESCRIPTION

The following description will describe the invention in relation to preferred embodiments of the invention, an above plate coolant containment and recovery system for a cutting or milling machine, including a dry cutting system with a machine cutting system having spindle coolant and a recovery system as used in thermal cutting, combined with machining operations. The invention is in no way limited to these preferred embodiments as they are purely to exemplify the invention only and that possible variations and modifications would be readily apparent without departing from the scope of the invention. One example of the use of the present invention is being used for a profile cutting machine.

The invention is designed to enable spindle coolant or coolant in general to be used on a machine that incorporates at least one machining head (for machining plate with coolant using at least one cutting tool) and to enable the recovery and reuse of the coolant, above a plate being cut, to enable significant amounts of coolant to be applied to machining tools while limiting the coolant to the containment area around the tool.

When coolant is applied during machining operations, such as drilling, any coolant applied to the top of a plate to be cut, remains on the top of the plate until the drill has broken through the bottom of the plate whereby, almost all the coolant applied during machining operations can be extracted from above the plate during these operations before the drill has cut through the bottom of the plate. The Figures show a combined machining machine and thermal cutting machine. The thermal cutting machine includes a profile cutting machine having various cutting tools.

In summary the present invention seeks to contain coolant such that the coolant with waste is contained and directed away for reuse without interfering with the rest of the surface of the plate, or other processes that may be required such as thermal cutting.

Figure 1:
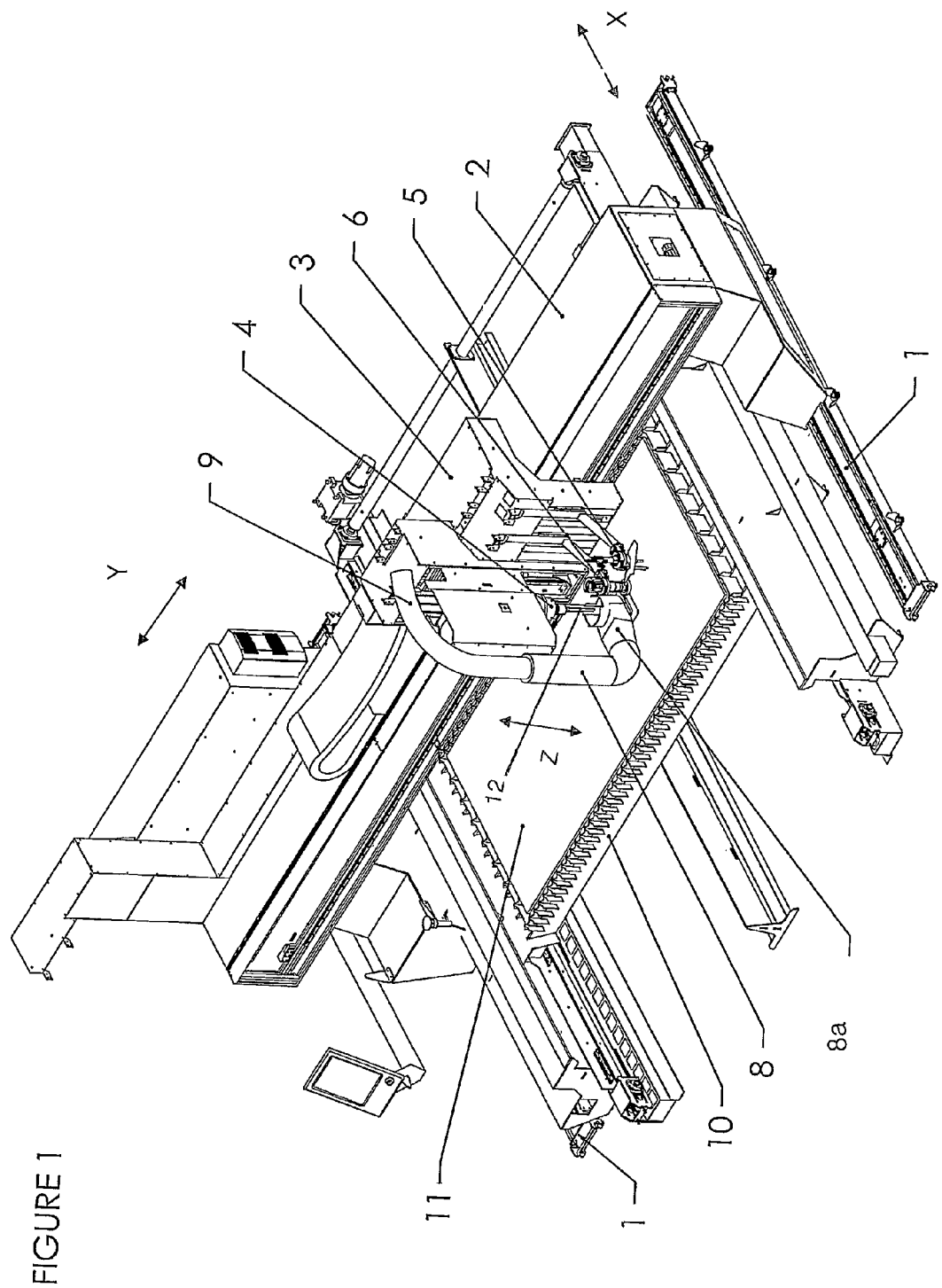
FIG. 1 is a schematic representation of the machine assembly in accordance with a first preferred embodiment of the invention.

FIG. 1 is a schematic showing a machine gantry 2 that can travel in an X axis along machine rails 1 in a substantially horizontal plane. The machine rails 1 can be located on the ground or floor. A carriage 3 is mounted to the gantry 2 and is fitted with a machining head 4 and thermal cutting heads 5 and 6, whereby the carriage 3 travels in a substantially horizontal plane in a Y axis along the gantry 2. In this embodiment the machining head 4 is a machining spindle 4 has coolant applied to the cutting tool and the thermal cutting heads 5 and 6 are an oxygen fuel torch and plasma torch respectively (hoses to theses cutting torches are removed for clarity) to provide a cutting face at the base of the tools to then be able to cut as required.

Each of machining head 4 and thermal cutting heads 5 and 6 can also be moved vertically and so each is fitted with an individual Z axis drive to raise and lower each cutting tool substantially vertically in the Z axis relative to a plate 11 to be cut.

In FIG. 1 the plate 11 is supported on a cutting table 10 which supports the plate 11 for various cutting processes at a cutting face, such as using coolant and dry cutting processes, and enables a fume extraction apparatus (not shown) to be mounted under the cutting table 11 for fume extraction during the dry cutting process such as thermal cutting processes.

In this example of a combined machining and thermal (dry) cutting machine as shown in the Figures, the machining head 4 includes a coolant guard apparatus 7 which includes at least one containment area and a clamping means in the form of at least one plate clamp member 7a.

Figure 2:
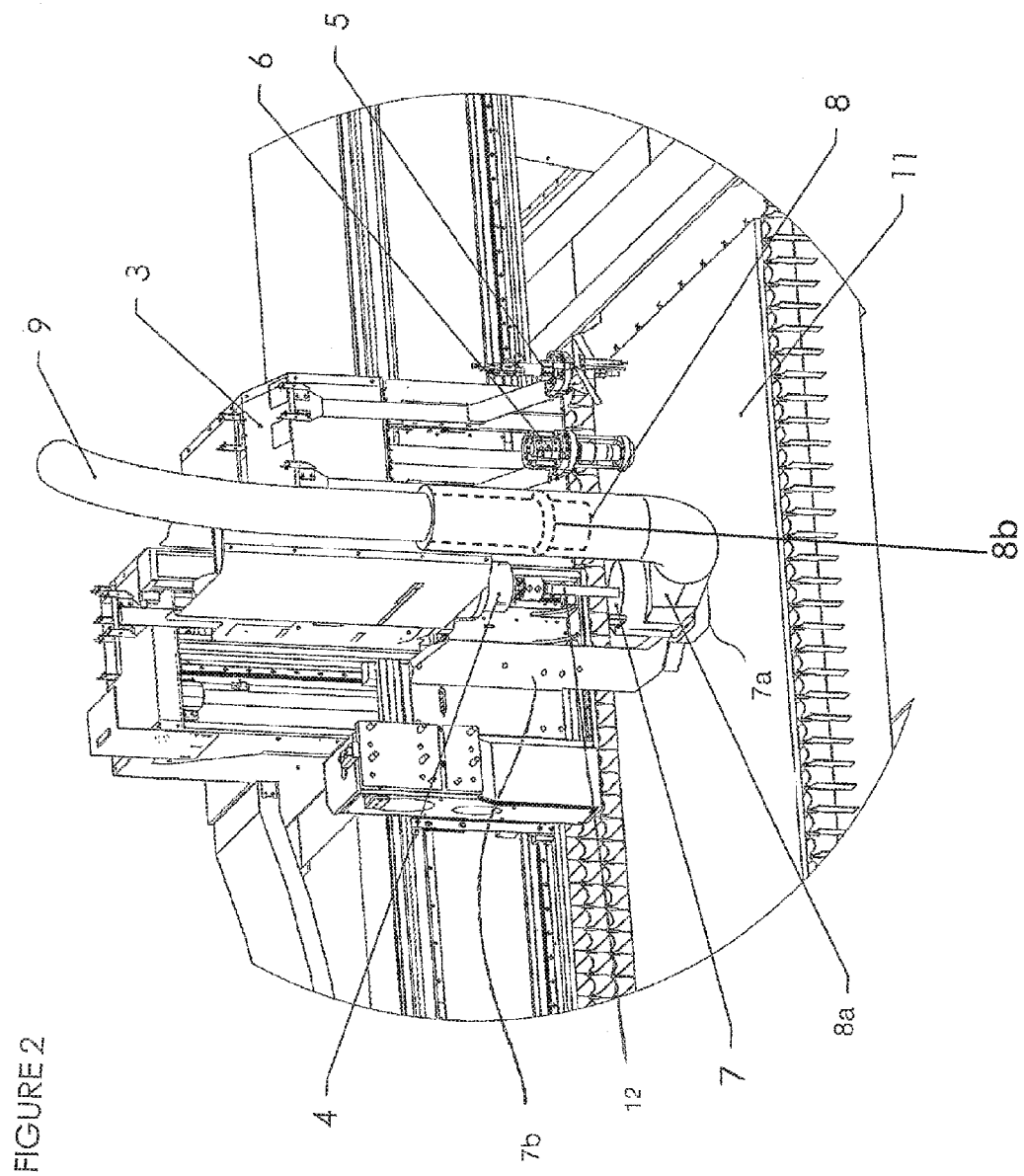
FIG. 2 is an upper perspective close up view of the coolant recovery system for coolant applied to the top of the plate.

The plate clamp member 7a is shaped and functioned as a planar member to clamp or almost seal to a top of at least one plate 11 on the cutting table 10 while still allowing cutting operations to occur, in combination with a waste removal means in the form of ducting sections 8 and 9 to form a substantially fluidly sealed containment area for the coolant whereby the waste removal means using suction as a vacuum can remove the waste without substantial leakage beyond the containment area. The waste removal means consists of at least one ducting section. In use the coolant guard apparatus 7 is required to functionally move in the Z axis while being connected and movably supported to the machining head 4 by at least one slidably movable vertical arm member 7b as seen in FIG. 2. The clamping means 7a, like the coolant guard apparatus 7, can be formed as a ring shaped member with at least one exit aperture leading to the ducting therein to allow for the removal of coolant. Typically the clamping means causes the perimeter wall to contact the plate being cut but this contact is not usually completely sealed but is enough to enable the vacuum of the waste removal means in the form of ducting sections 8 and 9 to remove or take away the waste.

The coolant guard apparatus 7 has a support structure forming a containment area such that the guard is joined or connected to at least one vertical arm member 7b. Therefore as a result of this support structure, coolant guard apparatus 7 has an independent Z axis drive which enables the coolant guard apparatus 7 combined with the plate clamp 7a, to move vertically and prior to the Z axis movement of a cutting tool such as the machining head spindle assembly if required. An alternative coolant guard apparatus mounting is that the clamp means and coolant guard apparatus could be connected to the Z axis of the machining head, and gravity or other means of applying pressure, such as compressed air, could clamp the containment area to the plate.

Typically machining involves the use of coolant as a fluid whereby the cutting process produces fluid waste in the form of coolant and solid waste chips, metal debris etc. This means that the coolant guard apparatus 7 is able to restrict the amount of coolant being used and limit its spread over the cutting table 10 and plate 11, during cutting.

As shown in the Figures, the above plate coolant containment and recovery system is provided with a method of waste removal by waste removal means in the form of interconnected ducting sections 8 and 9 of tubing fluidly connected from the at least one aperture at a lower end to the cutting face and an upper end, fluidly connected to a storage means (not shown) or back down into the spindle to be reused.

The coolant guard apparatus 7 includes at least one shaped containment area bordered by at least one perimeter substantially upright wall located above the clamping means i.e. plate clamp member 7a. In this example the upright wall is substantially circular in plan view and is dimensioned to allow the coolant guard apparatus 7 to be located on the clamping means 7a. The upright walls have at least one exit or aperture formed or cut therein, fluidly connected to the ducting section 8 and can be formed as a height above the table or plate as required to contain a suitable volume of coolant. The ducting section 8 extends upwardly from a lower end at the cutting face to a storage means (not shown) whereby any solid waste and coolant can be separated out so that coolant can be recycled back to an upper end of the machining spindle to be reused downwardly for cutting at the lower end or cutting face. Where the ducting fluidly joins to the perimeter walls of the coolant guard apparatus 7 there can be a transitional shape such as shown in the FIGS. 1 and 2 which is formed as an open funnel 8a.

A lower ducting section 8 slidably inter-fits with an upper ducting section 9. In this example, the upper section 9 is dimensioned to slide within the lower ducting section 8 to allow for vertical movement of the coolant guard apparatus 7. A sealing means such as a sliding seal 8b (shown hidden) is fitted between the sliding ducting sections 8 and 9.

The carriage and cutting tools have an upper end and lower end such that the waste removal means in the form of ducting sections 8 and 9 form a pathway from the cutting face at the lower end upwards to the upper end where coolant from the cutting face is pushed or sucked to the upper end and on to a storage means (to separate out any solid waste from liquid waste) and then allow the liquid waste or coolant to go back through the spindle to be directed downwards again to the cutting face of the machining tool.

FIG. 2 is a schematic showing a close up view of the coolant guard apparatus 7 which can be combined with the clamp 7a, lowered down, clamping and pressing down on the plate 11 to the table 10 to enable coolant containment between the clamp 7a and the plate 11. The clamp 7a is shown as being combined or formed together with the coolant guard 7, and can be called a clamp foot. FIG. 2 shows a drilling tool 12 mounted into machining spindle 4. In this embodiment the tool 12 and spindle of machining head 4 have the ability to pass coolant through the middle of each item such that coolant entering into the top of the machining head 4 will exit at the faces of the cutting tool 12 at the lower end such that cooling and lubrication are applied to the cutting faces, to provide coolant downwardly through the inside of the drilling tool 12 to the cutting faces at the plate 11 on the table 10.

As shown in FIG. 2, as coolant exits the drilling tool 12 mounted in the spindle during machining or cutting operations, the liquid waste (e.g. coolant) and solid waste (e.g. —chips) will be contained by the coolant guard 7 and clamp foot while the coolant is then directed up the ducting sections 8 and 9 of the waste removal means for re-use, by application of a vacuum and/or air jets to the ducting sections 8 and 9.

In FIG. 2 the waste from machining or drilling i.e. coolant and machining chips as contained inside the guard 7 of combined plate clamp and coolant guard is extracted or drawn or pushed vertically up and inside waste removal means ducting sections 8 and 9. In one example waste removal means in the form of ducting sections 8 and 9 can be connected to further ducting (not shown) that is connected to a vacuum fan system (not shown) and deposited into a storage chamber (also not shown). In this instance the coolant as it settles out from the machining chips can then be pumped back to a coolant reservoir (not shown) for reuse and recycling.

In this example-air jets (not shown) can also be placed inside guard 7 and positioned opposite the exit aperture leading to the ducting and/or inside the ducting sections 8a, 8 or 9 to accelerate the coolant and waste (dross or chips) flow into 8a and so on through ducting sections 8 and 9 to improve the evacuation of coolant from the surface cleaning.

The invention in preferred embodiments may have one or more of the following advantages:
a) Since almost all coolant applied to a flat surface during operations such as drilling is applied prior to the cutting tool penetrating through a bottom surface of the plate, then almost all the coolant applied to the process can be recovered from the surface of the plate.
b) The above plate coolant contaminant & recovery system contains the coolant to a localised area thereby minimising the spread of coolant over the cutting surface thereby minimising contamination of the surface by the coolant
c) The above plate coolant contaminant & recovery system removes coolant and chips generated during machining operations and enables the coolant to be reused
d) Use less coolant than before
e) Cost savings for coolant
f) Use less filters than before—filters last longer
g) Faster processing of plate with more coolant at the cutting tools during machining operations
h) No need to have a large bath to capture of the waste
i) No need for manual removal of waste directly from the machine
j) Can be used with a water or wet cutting table machine or on a dry cutting machine
k) Can be used on a machine with a machining spindle and no other cutting heads
l) Can be used in any cutting or milling machine that uses coolant Variations Throughout the description of this specification, the word "comprise" and variations of that word such as "comprising" and "comprises", are not intended to exclude other additives, components, integers or steps. It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention.

Hence specific dimensions and other physical characteristics related to the embodiments disclosed herein are not to be considered as limiting.

The profile cutting machine can have any number of cutting tools. The clamp 7a and guard 7 can be formed as a one piece item or be formed as separate items or components which when being assembled can be removably joined or connected together. Waste removal means ducting sections 8 and 9 can be formed as removably interconnected components made from any suitable material such as for example plastics and metal which can be planar curved or corrugated to be stiff or flexible of any suitable diameter. There can be any number of different lengths of different shapes and orientation of the ducting.

The shaped containment area can be formed in any shape and height. Though the coolant guard apparatus 7 is shown as being circular in shape other shapes are equally possible. The upright walls of the coolant guard apparatus 7 can be vertically or any angle that still is able to contain the coolant therein which means that the walls of the coolant guard apparatus 7 can for example be angled outwardly or angled inwardly. The coolant guard apparatus 7 can be formed as a one-piece item having the containment area with clamping means or they can be formed separately and joined or removably connected together. Also, the coolant guard apparatus 7 is shown as being located above the clamping means but this can be located below the clamping means or the guard can be combined with the clamping means as a one-piece item, with the clamping means 7a formed as at least a portion of the coolant guard apparatus 7 which is manipulated to cause a downward force therethrough to cause the clamping.

The machining spindle includes a through spindle coolant means fluidly connected to the ducting which is adapted to allow coolant there through for cutting at the cutting face or alternatively the coolant can be supplied externally from the machining spindle directly onto the cutting tool.

Though a combined machine is shown as being used with the above plate coolant containment and recovery system, the present invention can equally be used in a separate machining apparatus i.e. with just a machining head or wet cutting system without any dry cutting.

The clamping means 7a can be formed as a separate component to the coolant guard apparatus and then joined or the clamping means can be formed as separate components or there can be just one body which is formed to contain the coolant and be able to manipulated to clamp down on to the plate 11. Air jets (not shown) can be placed wherever suitable in the guard or ducting to enable the air or fumes to be cleared or push coolant and or solid waste away from the cutting face or machining area while still allowing adequate and efficient machining to occur, and into the waste removal means in the form of ducting sections 8 and 9.

The coolant guard apparatus 7 can be dimensioned as required to allow a certain volume of coolant to be contained and to allow adequate removal therefrom. Therefore the guard area can be smaller or larger or smaller than the clamp 7a and the height of the substantially upright walls can be as high as required. The aperture within or through the containment area can be as large as percentage of the cross sectional area of the containment area as required to allow drainage there through or to contain and be recovered through the ducting sections 8 and 9.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described. Other apparatus as used for many of the physical systems of the present invention both electrically and mechanically are also included such as electrical systems, motors, mechanical linkage and control systems for suction or blow of fumes or air of fluid thought not specifically described are also included.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

The invention claimed is:

1. A machine including at least one cutting tool in the form of a cutting head with coolant supplied for machining parts from flat material, the machine having a coolant containment and recovery system which comprises:
   a waste removal apparatus;
   a coolant guard having at least one wall bounding a containment forming area, wherein the coolant guard is fluidly connected to the waste removal apparatus and wherein in use:
   said coolant guard is located upon a plate to be machined; and
   the containment forming area becomes a containment area, within which the cutting tool and coolant are both located during the machining process;
   wherein the waste removal apparatus comprises a lower ducting section fluidly connected with the containment forming area through the at least one wall of the coolant guard, and an upper ducting section, fluidly connected with the lower ducting section, which slidably inter-fits with the lower ducting section to allow relative movement between the lower ducting section and the upper ducting section.

2. The machine as claimed in claim 1, wherein the waste removal apparatus comprises a sliding seal between the lower ducting section and the upper ducting section.

3. The machine as claimed in claim 1, wherein the coolant guard is ring shaped.

4. The machine as claimed in claim 1, wherein the lower ducting section joins to the at least one wall of the coolant guard via a funnel.

5. The machine as claimed in claim 1, wherein the machine includes an apparatus to contain the removed coolant and remove any machining chips therefrom.

6. The machine as claimed in claim 1, wherein the coolant guard comprises a clamp member shaped and configured to contact the flat material.

7. The machine as claimed in claim 1, wherein the coolant is through-spindle coolant, or is coolant applied to the at least one cutting tool externally.

8. The machine as claimed in claim 1, wherein the coolant guard is operatively adapted to move vertically independently of any other operation of the at least one cutting tool.

9. The machine as claimed in claim 1, wherein the at least one cutting tool and the coolant guard are mounted to a carriage on a gantry, the gantry being operative to travel horizontally in a first axis.

10. The machine as claimed in claim 9, wherein the carriage is operative to travel horizontally in a second axis perpendicular to the first axis.

11. A coolant containment and recovery system for a machine for machining parts from flat material, the coolant containment and recovery system including:
    a waste removal apparatus comprising a lower ducting section fluidly connected to an upper ducting section configured to slidably inter-fit with the lower ducting section to allow relative movement between the lower ducting section and the upper ducting section;
    a coolant guard configured to be located in use upon a plate to be machined, the coolant guard including at least one wall bounding a containment forming area, wherein said wall fluidly connects the containment area to the lower ducting section of the waste removal apparatus.

12. The coolant containment and recovery system as claimed in claim 11, comprising a sliding seal fitted between the lower ducting section and the upper ducting section.

13. The coolant containment and recovery system as claimed in claim 11, wherein the coolant guard is ring shaped.

14. The coolant containment and recovery system as claimed in claim 11, wherein the lower ducting section joins to the at least one wall of the coolant guard via a funnel.

* * * * *